United States Patent
Srinivasan et al.

(10) Patent No.: US 10,936,319 B2
(45) Date of Patent: *Mar. 2, 2021

(54) PREDICTING CACHE MISSES USING DATA ACCESS BEHAVIOR AND INSTRUCTION ADDRESS

(71) Applicant: International Business Machines Corporation, Armonk, NY (US)

(72) Inventors: Vijayalakshmi Srinivasan, New York, NY (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/010,427

(22) Filed: Jun. 16, 2018

(65) Prior Publication Data

US 2018/0300141 A1 Oct. 18, 2018

Related U.S. Application Data

(63) Continuation of application No. 13/099,178, filed on May 2, 2011, now Pat. No. 10,007,523.

(51) Int. Cl.
*G06F 9/38* (2018.01)

(52) U.S. Cl.
CPC ............ *G06F 9/383* (2013.01); *G06F 9/3832* (2013.01); *G06F 9/3836* (2013.01); *G06F 9/3844* (2013.01); *G06F 9/3851* (2013.01)

(58) Field of Classification Search
CPC .............. G06F 9/3806; G06F 9/30145; G06F 9/30043; G06F 9/3832; G06F 9/3836;

(Continued)

(56) References Cited

U.S. PATENT DOCUMENTS 5,758,142 A    5/1998  McFarling
6,487,639 B1  11/2002  Lipasti
(Continued)

OTHER PUBLICATIONS

R.E. Kessler— "The Alpha 21264 Microprocessor: Out-of-Order Execution at 600 MHz", Compaq Computer CORP_,1 Hot-Chips, 10, Aug. 1998 p. 1-9.

(Continued)

*Primary Examiner* — Yaima Rigol
(74) *Attorney, Agent, or Firm* — Vazken Alexanian; Otterstedt, Wallace & Kammer, LLP

(57) ABSTRACT

In a decode stage of hardware processor pipeline, one particular instruction of a plurality of instructions is decoded. It is determined that the particular instruction requires a memory access. Responsive to such determination, it is predicted whether the memory access will result in a cache miss. The predicting in turn includes accessing one of a plurality of entries in a pattern history table stored as a hardware table in the decode stage. The accessing is based, at least in part, upon at least a most recent entry in a global history buffer. The pattern history table stores a plurality of predictions. The global history buffer stores actual results of previous memory accesses as one of cache hits and cache misses. Additional steps include scheduling at least one additional one of the plurality of instructions in accordance with the predicting; and updating the pattern history table and the global history buffer subsequent to actual execution of the particular instruction in an execution stage of the hardware processor pipeline, to reflect whether the predicting was accurate.

4 Claims, 9 Drawing Sheets

(58) Field of Classification Search
CPC ............. G06F 9/324; G06F 2212/1021; G06F 2212/6026; G06F 9/383; G06F 9/3844; G06F 9/3851
See application file for complete search history.

(56) References Cited

U.S. PATENT DOCUMENTS

| | | | |
|---|---|---|---|
| 6,745,323 B1 | 6/2004 | Sinharoy | |
| 2002/0091915 A1* | 7/2002 | Parady | G06F 9/3885 |
| | | | 712/225 |
| 2002/0194465 A1 | 12/2002 | Sinharoy | |
| 2003/0208665 A1* | 11/2003 | Peir | G06F 9/383 |
| | | | 711/169 |
| 2004/0250054 A1 | 12/2004 | Stark | |
| 2006/0277397 A1 | 12/2006 | Sartorius | |
| 2007/0038846 A1* | 2/2007 | Kadambi | G06F 9/30043 |
| | | | 712/225 |
| 2007/0143580 A1* | 6/2007 | Musoll | G06F 9/3804 |
| | | | 712/205 |
| 2007/0186080 A1* | 8/2007 | Luick | G06F 9/3812 |
| | | | 712/214 |
| 2008/0162895 A1* | 7/2008 | Luick | G06F 9/3824 |
| | | | 712/220 |
| 2008/0263341 A1* | 10/2008 | Ozer | G06F 9/383 |
| | | | 712/239 |
| 2009/0024835 A1* | 1/2009 | Fertig | G06F 9/383 |
| | | | 712/207 |
| 2009/0157985 A1 | 6/2009 | Stevens | |
| 2009/0172360 A1* | 7/2009 | Hikichi | G06F 9/3824 |
| | | | 712/216 |
| 2009/0254734 A1 | 10/2009 | Kadambi | |
| 2009/0287903 A1* | 11/2009 | Hsu | G06F 8/4442 |
| | | | 711/213 |
| 2010/0262813 A1* | 10/2010 | Brown | G06F 9/30058 |
| | | | 712/240 |
| 2010/0332801 A1 | 12/2010 | Fryman | |
| 2012/0284463 A1 | 11/2012 | Srinivasan | |
| 2014/0195788 A1* | 7/2014 | Kalogeropulos | G06F 8/4442 |
| | | | 712/237 |

OTHER PUBLICATIONS

Yoaz et al - "Speculation techniques for improving load related instruction scheduling", Computer Architecture News, sol 27, No: 2, 1999, pp. 42-53.
Peir. J et al "Bloom filtering cache misses for accurate data speculation and prefetching", Proceedings of the 16th International Conference on Supercomputing, Acm, New York (2002) pp. 189-198.
eMemik et al "Just Say No: Benefits of Early Cache Miss Determination", Proceedings of the 9th International Symposium on High-Performance Computer Architecture (2003), p. 307-316.

* cited by examiner

US 10,936,319 B2

PREDICTING CACHE MISSES USING DATA ACCESS BEHAVIOR AND INSTRUCTION ADDRESS

CROSS-REFERENCE TO RELATED APPLICATIONS

This application is a continuation of U.S. patent application Ser. No. 13/099,178 filed May 2, 2011, the complete disclosure of which is expressly incorporated herein by reference in its entirety for all purposes.

FIELD OF THE INVENTION

The present invention relates to the electrical, electronic and computer arts, and, more particularly, to computer architecture and the like.

BACKGROUND OF THE INVENTION

The latency of first-level (L1) cache misses is a significant factor with respect to pipeline stalls in processors. The latency of a load instruction depends on whether or not the data exists in the L1 cache. However, at the time the load instruction is issued, it is not possible to determine whether or not the data will be present in the L1 cache. This affects issuing those instructions that are dependent on the load instruction, and leads to pipeline stalls and performance degradation.

In most of today's processors, the scheduler assumes that the data accessed by the load instruction will be available in the L1 cache. Dependent instructions are issued based on this assumption. A reject-and-replay mechanism is triggered when the load misses the cache. When the load instruction incurs a cache miss, it leads to not only a performance penalty, but also a power overhead.

The Compaq Alpha 21264 used the most significant bit of a 4-bit saturating counter as the load instruction's hit or miss prediction. The counter was incremented by one every time a load hit, and decremented by two every time a load missed. Typically, only a small percentage of static load instructions are responsible for a large fraction of the cache misses. The above counter can be easily saturated with the load instructions that usually have cache hits, and hence lead to mispredictions.

Yoaz et al, in "Speculation techniques for improving load related instruction scheduling," Computer Architecture News, vol. 27, No. 2, pp. 42-53, 1999 used 2-level local predictors, 2-level global predictors, and hybrid predictors for cache hit or miss prediction. Here again, the predictors predominantly predict as hits, and hence result in re-issuing of instructions.

SUMMARY OF THE INVENTION

Principles of the invention provide techniques for predicting cache misses using data access behavior and instruction address. In one aspect, an exemplary method includes the steps of decoding, in a decode stage of hardware processor pipeline, one particular instruction of a plurality of instructions; determining that the particular instruction requires a memory access; and, responsive to determining that the particular instruction requires a memory access, predicting whether the memory access will result in a cache miss. The predicting in turn includes accessing one of a plurality of entries in a pattern history table stored as a hardware table in the decode stage. The accessing is based, at least in part, upon at least a most recent entry in a global history buffer. The pattern history table stores a plurality of predictions. The global history buffer stores actual results of previous memory accesses as one of cache hits and cache misses. Additional steps include scheduling at least one additional one of the plurality of instructions in accordance with the predicting; and updating the pattern history table and the global history buffer subsequent to actual execution of the particular instruction in an execution stage of the hardware processor pipeline, to reflect whether the predicting was accurate.

In another aspect, an exemplary hardware processor includes a decode pipeline stage which decodes one particular instruction of a plurality of instructions; hard-wired logic circuitry which determines that the particular instruction requires a memory access; a pattern history hardware table within the decode pipeline stage; and a global history buffer within the decode pipeline stage. Also included is hard-wired logic circuitry which, responsive to determining that the particular instruction requires a memory access, predicts whether the memory access will result in a cache miss. The predicting in turn includes accessing one of a plurality of entries in the pattern history hardware table. The accessing is based, at least in part, upon at least a most recent entry in the global history buffer. The pattern history hardware table stores a plurality of predictions. The global history buffer stores actual results of previous memory accesses as one of cache hits and cache misses. Also included are an issue pipeline stage which schedules at least one additional one of the plurality of instructions in accordance with the predicting; an execution pipeline stage which actually executes the particular instruction; and hard-wired logic circuitry which updates the pattern history hardware table and the global history buffer subsequent to the actual execution of the particular instruction, to reflect whether the predicting was accurate.

In still another aspect, an exemplary hardware processor includes means for carrying out the method steps. The means include various structures disclosed herein, such as hardware tables, buffers such as shift registers, and hard-wired logic circuitry to implement the method steps.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Techniques of the present invention can provide substantial beneficial technical effects. For example, one or more embodiments may provide one or more of the following advantages:

- If the outcome of the cache access can be successfully predicted using the methods described herein, the issue logic of the processor can re-schedule the instructions such that the dependent instructions following the load will not be issued, and the resources can be put to better use by issuing independent instructions to improve the performance.
- In a multi-threaded processor, cache hit/miss prediction information can be used to launch a load instruction from a thread predicted to miss the cache in advance so that the stall can be overlapped by executing instructions from the other threads to increase the overall throughput One or more embodiments of the invention enable out-of-order scheduling, by allowing a younger load instruction predicted to have a cache miss, and with no data dependences, to go ahead of an older load predicted to have a cache hit, and with no data dependences.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
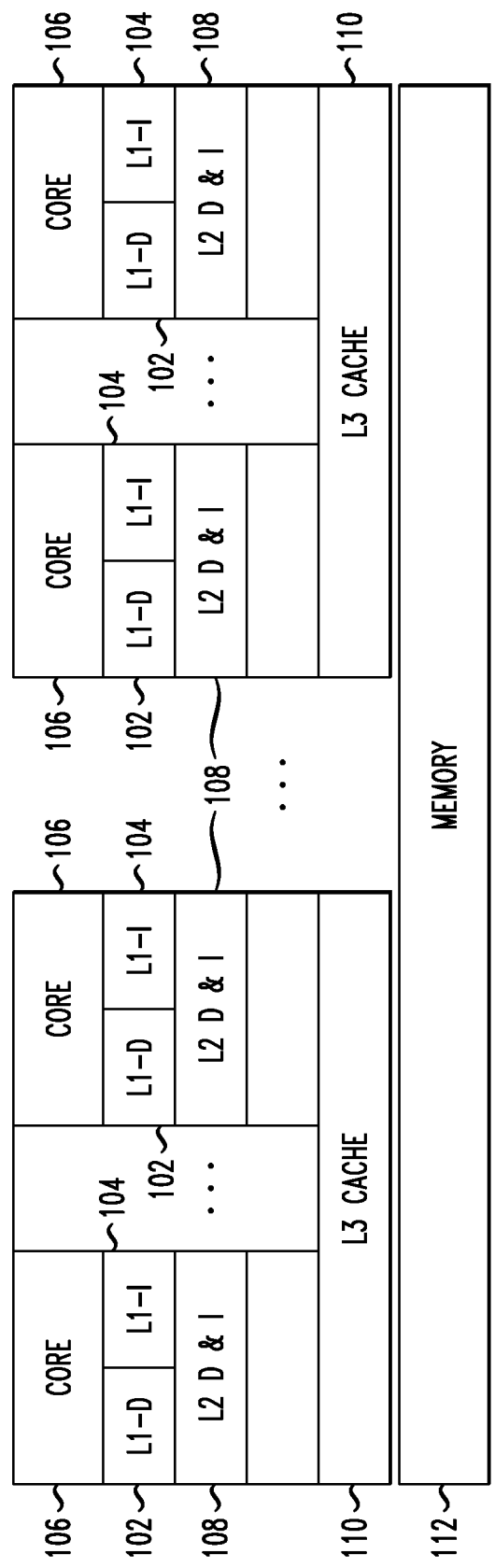
FIG. 1 shows memory and cache hierarchy of a modern multi-core system, which represents a non-limiting example of a system wherein one or more embodiments can be implemented.

FIG. 1 depicts a typical hierarchy of memory and cache of a modern multi-core system. Note L1 caches for data 102 and instructions 104; cores 106; L2 data and instruction caches 108; L3 caches 110; and memory 112. The access latency for instructions (labeled 'I' in FIG. 1) and data (labeled 'D' in FIG. 1) increases from L1 cache to L2 cache to L3 cache to memory.

One or more embodiments combine the knowledge of global cache hit/miss behavior of the data accesses of an application, and the individual load instruction's hit-miss behavior, to accurately predict the cache hit-miss behavior of a load instruction. If the outcome of the cache access can be successfully predicted, the issue-logic of the processor can effectively re-schedule the instructions such that the dependent instructions following the load will not be issued, and the resources can be put to better use by issuing independent instructions. In addition, in a multi-threaded processor, such prediction information of the cache access outcome can be used to launch a load instruction from a thread predicted to miss the cache in advance so that the stall can be overlapped by executing instructions from the other threads to increase the overall throughput.

Furthermore, one or more instances enable out-of-order scheduling, by allowing a younger load instruction predicted to have a cache miss, and with no data dependencies, to go ahead of an older load predicted to have a cache hit, and with no data dependencies.

The bursty nature of cache misses of applications is well-known. One or more embodiments exploit this behavior to design a predictor to determine if the application is likely to incur a cache miss/hit.

In one or more embodiments, it is sufficient to track a change from a "miss" dominated region to a "hit" dominated region. A contiguous string of "hits" or "misses" will determine whether the next cache access is a hit or a miss. This is different from the behavior of branches.

One or more embodiments employ the "generic" idea in branch direction predictors. Typically, conditional branches have two possible outcomes, "not taken" (NT) in which the instruction following the branch instruction is the next instruction in the static program sequence, or "taken" (T) in which the instruction following the branch instruction is the target instruction which may not be the next contiguous instruction in the static program sequence. Typically, branch predictors are employed to predict the outcome of the branches (NT or T). Typically, these predictors use a saturating counter which is incremented if the branch is "taken" and decremented if the branch resolves as "not taken." If the most significant bit of the saturating counter is set (to 1), the branch is predicted taken; otherwise, the branch is predicted not taken. One or more embodiments of the invention also use a predictor to predict the cache access outcome as "hit" or "miss," and one or more embodiments of an exemplary method use a saturation counter for the prediction. Thus, one or more embodiments employ the "generic" idea in branch direction predictors, but effectively exploit the fact that cache misses are bursty, such that a small percentage of load or store instructions are responsible for a large percentage of cache misses, and that, as just noted, it is sufficient to track a change from a "miss" dominated region to a "hit" dominated region. In one or more embodiments, predict the next cache access outcome based on the length of the last seen contiguous string of "hits" or "misses." A Global History Buffer (GHB) tracks the last N cache access outcomes, and a Pattern History Table (PHT) predicts the outcome of the next reference. The PHT is indexed using the length of the last contiguous string of "hits" or "misses" from the GHB. Significantly, in one or more embodiments, the number of entries in the PHT is N (length of GHB), and not $2^N$.

Figure 7:
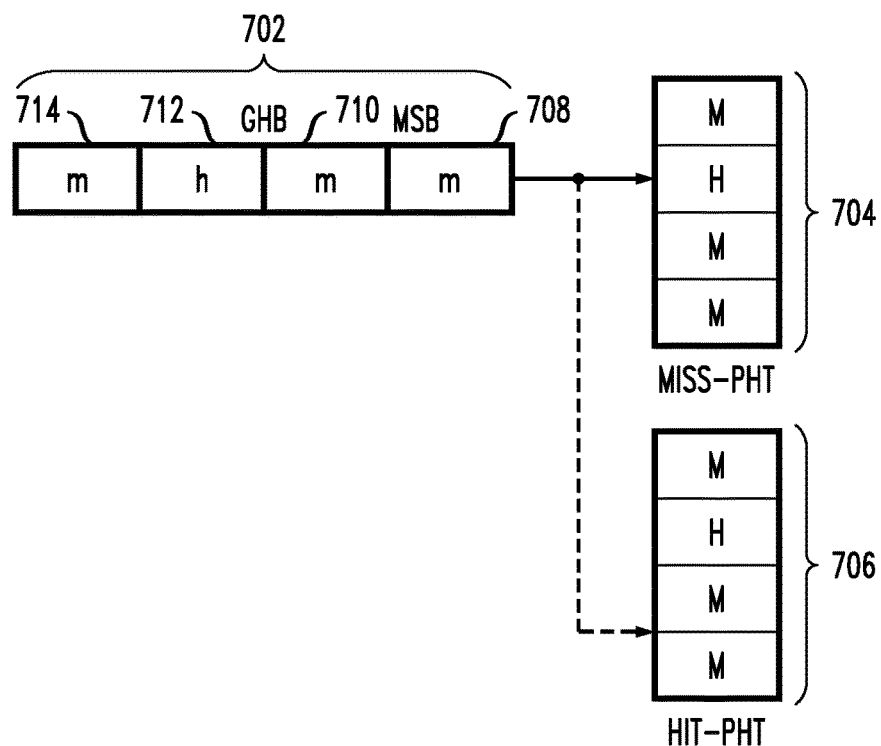
FIG. 7 depicts a third exemplary embodiment for global application hit/miss prediction, according to an aspect of the invention.
Figure 8:
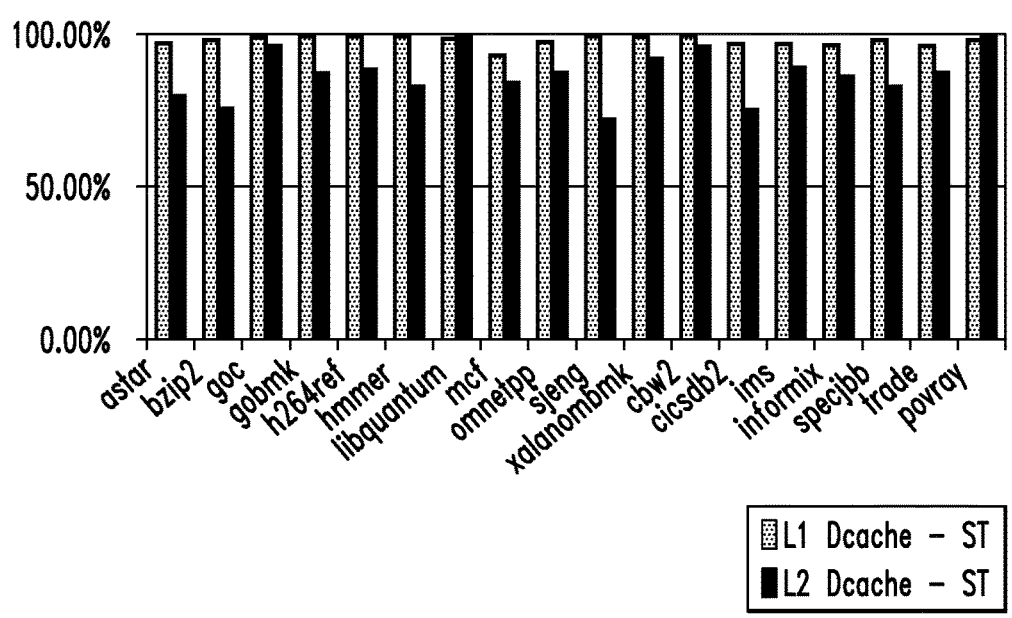
FIGS. 8-11 show additional exemplary prediction accuracy for L1 and L2 Dcache, according to an aspect of the invention.
Figure 9:
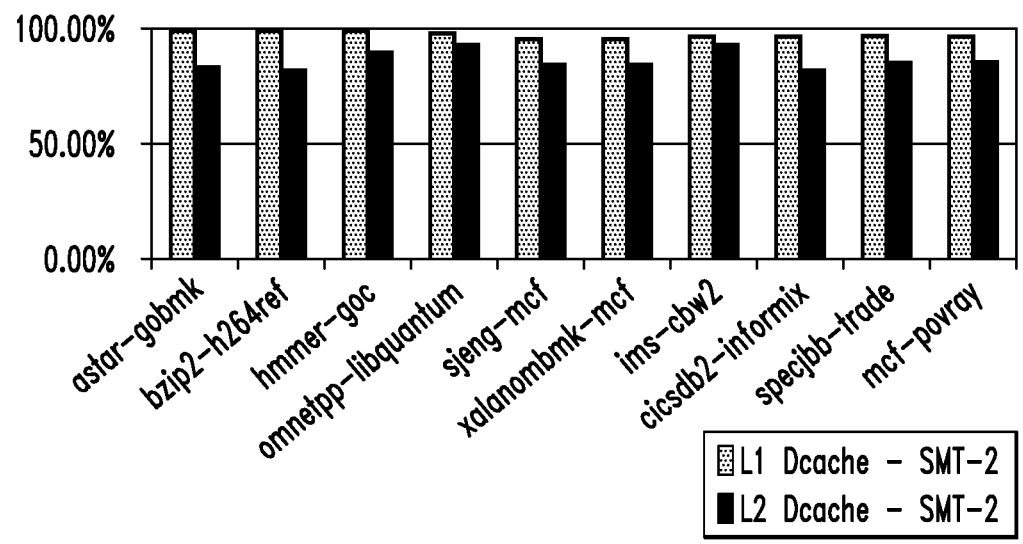
Figure 10:
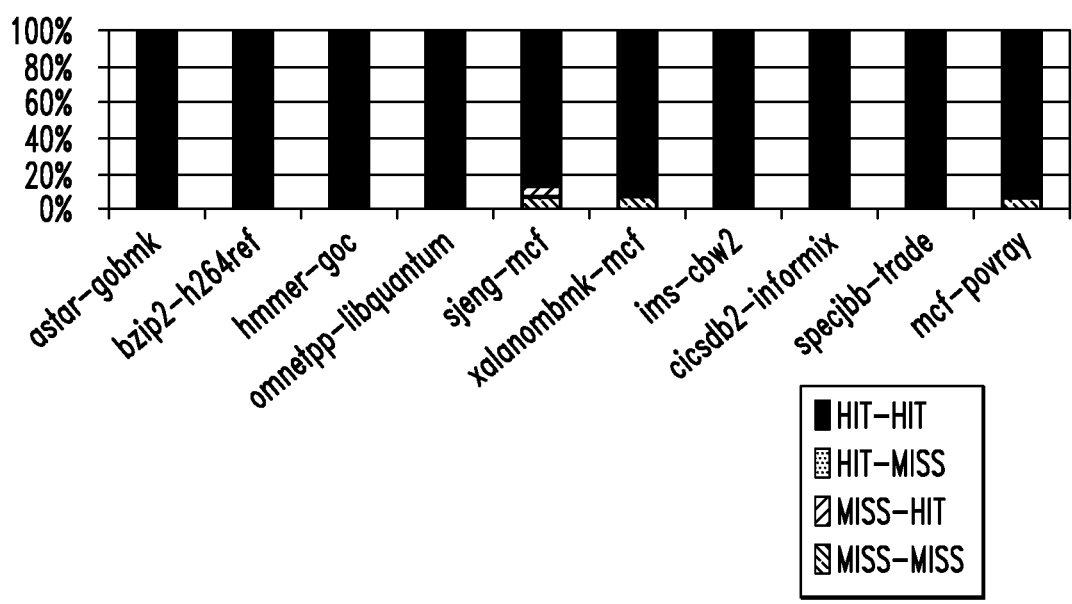
Figure 11:
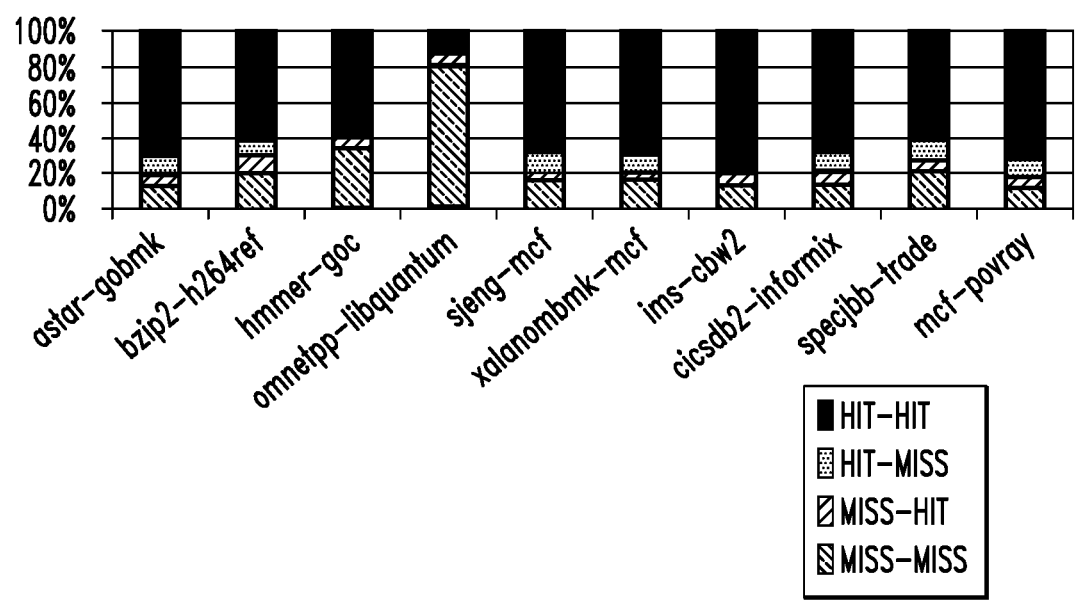

Global Hit/Miss Prediction:

Referring now to FIG. 7, in one aspect, a two-level predictor is provided to predict whether the current reference will be a hit or miss based on the sequence of hits and misses seen in the past. One hardware structure includes GHB (global history buffer) 702, having N bits. In particular, in one or more embodiments, the history register 702 is an N-bit shift register which shifts in bits representing the cache access outcome (hit or miss) of the most recent N accesses. Additional hardware structures include two PHTs (pattern history tables), namely, Miss-PHT 704 and Hit-PHT 706. In one or more embodiments, each PHT size is N entries (and not 2^N entries). The PHT has only 2-bits per entry to predict hit or miss. If the most significant bit (MSB) is 1, predict a miss, else predict a hit. One method step useful in connection with the hardware embodiment of FIG. 7 includes determining which PHT to access. In some cases, if the most significant bit (MSB) of the GHB is a "Miss," as seen at 708, access the Miss-PHT 704, otherwise, access the Hit-PHT 706. Another method step useful in connection with the hardware embodiment of FIG. 7 includes determining the PHT index. In some cases, start traversing the GHB bits starting from the MSB 708. Stop the traversal at the first bit that is different from the MSB. The number of bits traversed is used as the index of the PHT. The maximum number of bits traversed is equal to the length of the GHB, and hence a PHT size of N entries is sufficient. In the example of FIG. 7, bit 710 is the same as 708, while bit 712 is the first bit that is different. (Bit 714 is labeled for completeness.) The traversal would be stopped at bit 712. The number of bits traversed is two. Still another method step useful in connection with the hardware embodiment of FIG. 7 includes updating the PHT. In some cases, after the outcome of the current prediction is known, before entering the outcome in the GHB 702, again determine the PHT's index, and access the appropriate PHT, as described just above. In particular, if the current outcome is a miss, increment the chosen PHT entry, while if the current outcome is a hit, decrement the chosen PHT entry.

Figure 2:
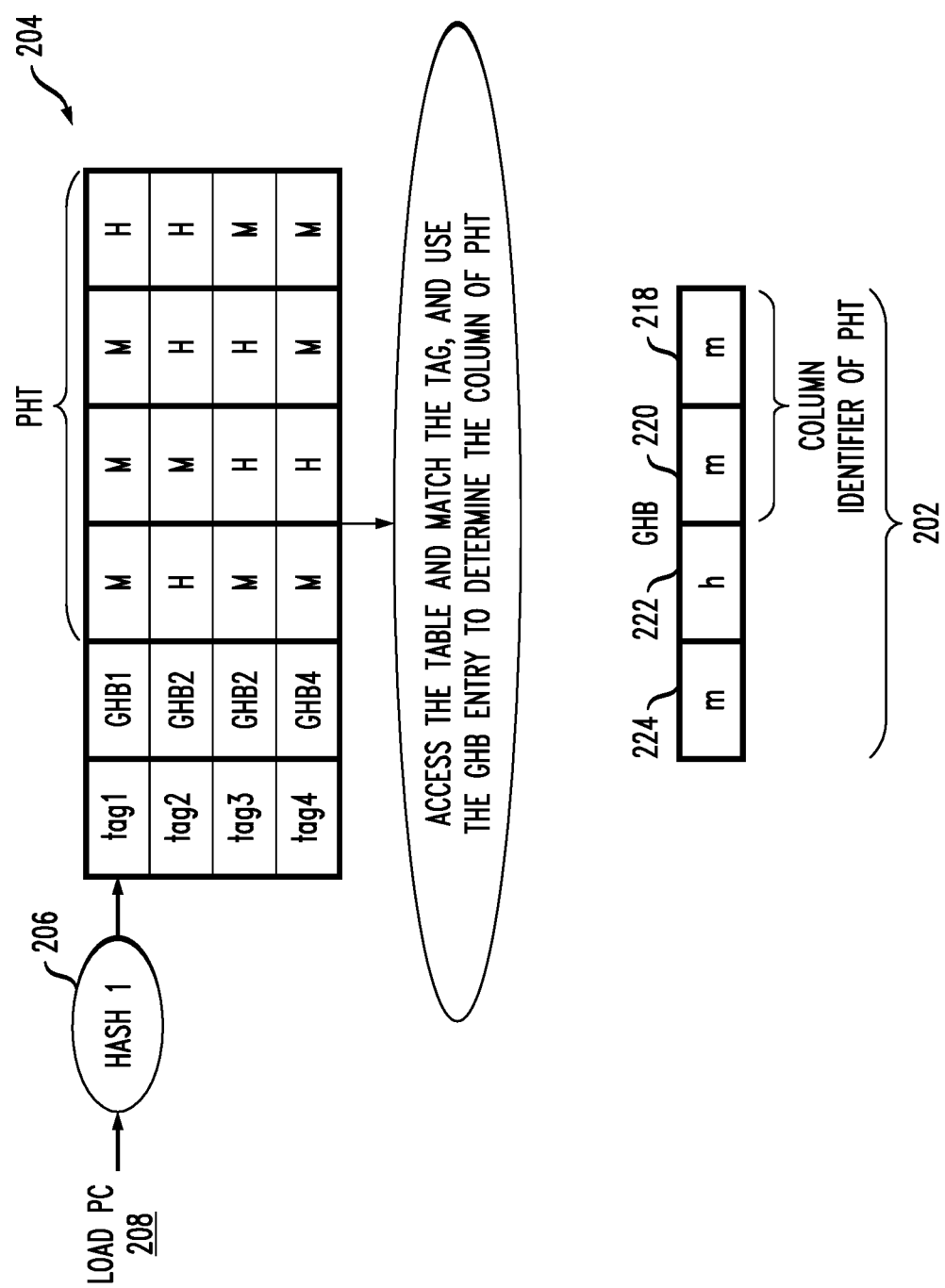
FIG. 2 depicts a first exemplary embodiment for per-load hit/miss prediction, according to an aspect of the invention.

Load PC-Based Hit/Miss Prediction:

Referring now to FIG. 2, in another aspect, load PC-based hit/miss prediction is provided. In this context, "PC" stands for "program counter."

LOAD and STORE instructions are the memory instructions that access data from a cache. Instructions come with an instruction address (the program counter or PC). In one or more embodiments, consider that the LOAD instruction has, as one of the operands of the instruction, fields to help compute the memory address, such that the data at that address in the cache memory can be accessed and read into a register. If there is a miss in L1, go to L2, and so on; if all cache levels miss go to the main memory. The data is brought back to the register. In one or more embodiments, do not await decoding of the instruction fields (operands), address determination, or cache access, to predict whether the data is present in the cache or not. Instead, make such a prediction well ahead of time.

So, the LOAD instruction is fetched and decoded so as to determine that it is in fact a LOAD instruction; however, as just noted, decoding of the operands, address determination, and cache access have not yet taken place. At this stage, predict whether the data to be accessed by this instruction will be present in the cache. Instead of waiting to determine the memory address, one or more embodiments employ the instruction's address (instruction LOAD PC) to predict whether the data accessed by the instruction will be in the cache. Thus, LOAD PC 208, rather that the data address accessed by the LOAD instruction, is used to make the prediction.

One or more embodiments are implemented entirely in hardware. In one or more embodiments, suitable hardware elements include hardware tables, hardware counters, and similar structures. One or more embodiments use a few bits of the LOAD PC. For example, suppose there are 16 entries in the pattern history table (PHT) 204, which is the table used for the prediction of whether the given load instruction will trigger a cache hit or a cache miss for the data it is accessing. The PHT is preferably implemented as a hardware table. In the non-limiting example of a 16-entry PHT, each table entry can be uniquely addressed with four bits (ranging from binary 0000 to binary 1111).

In the non-limiting example, use 4 bits of the LOAD PC having a value ranging from decimal zero to decimal fifteen; such 4 bits uniquely specify the appropriate location in the PHT. The Hash1 function 206 could include, for example, taking the middle four bits of the LOAD PC 208 and using same for the index. In the general case, if the PHT has M entries, log M bits are needed for unique addressing. Other non-limiting exemplary hash functions include taking the highest ordered four bits of the LOAD PC and the lowest-ordered four bits of the LOAD PC, and applying an XOR operation to obtain four new bits which are used to index the PHT. In general, where there are M entries in the PHT, log M bits are used for the index; those log M bits can be determined by some combination of the LOAD PC bits. Given the teachings herein, the skilled artisan can select an appropriate hash function. A good hash function should result in as few collisions as possible. If two different LOAD PCs have the same value for the four bits of the Hash1 function, they will go to the same entry of the PHT, resulting in a collision wherein the update from one load will be lost because the other LOAD will overwrite it. The hash is used to avoid an expensive operation of searching through the entries and will inevitably result in some amount of collisions.

Another aspect to assist in making a good prediction is to employ a significant portion of the LOAD PC 208 (by way of example and not limitation, the uppermost 20 bits) as a tag that is stored in the PHT (see tag1, tag2, tag3, and tag4 stored in the first column of the PHT 204). Thus, the Hash1 is used to address a particular entry of the PHT and then a check is made whether the tag of the current load instruction matches the tag stored in that row of the PHT 204. If they match, then it is concluded that the latest update to the entry in the PHT was likely made by the same LOAD. If there is no match, do not read the prediction corresponding to the four bits from Hash1, as it is likely that a different instruction hashed into the table at the location addressed by the four bits of Hash1, thus avoiding mis-prediction. Thus, the tagging feature increases the confidence that a given entry in the PHT is from the last occurrence of the same LOAD and not from some different LOAD.

To review, the Hash1 addresses a unique entry in the PHT 204; and a comparison is made between the tag corresponding to that entry in the PHT and the tag (i.e., corresponding bits) for the current PC. In case of a match, use the entry for the prediction; if not, do not read the entry for the prediction. Thus, use Hash1 to access the PHT 204 and if there is a match for the tag, next use the GHB (global history buffer) entry in that particular row to determine the column of the PHT to be used to make the prediction. In the non-limiting example, the GHB 202 has the most recent N outcomes for the particular tag (in this case, for the particular LOAD). Typically, the same LOAD instruction will be seen several times when the program is executed (for example, it may be repeated in a loop). For each occurrence of a particular load instruction, whatever happened when it accessed the cache (i.e., that (true, not predicted) outcome) is pushed into the global history buffer of N bits. GHB is like a shift register—push the most recent outcome on the right side and shift all other entries left one bit. Since the only outcome is hit or miss, only a single bit is needed to record the result (for example, encode a hit as a logical one and a miss as a logical zero). The most recent outcome resides in the right-hand (most significant) bit 218.

Now, depending on the number of columns to be used (which in turn depends on the available amount of hardware space/area), examine that many bits of the GHB, starting from the most recent bit. In the non-limiting example of FIG. 2, four columns are used (the first two columns of table 204 are the tags and GHBs while the last four columns are the actual PHT entries, such that four columns are used in this example). Note that other numbers of columns could be used in other embodiments; say, eight columns in another non-limiting example. Due to the bursty nature of cache misses, it is sufficient to track a change from a "miss" dominated region to a "hit" dominated region. A contiguous string of "hits" or "misses" will determine whether the next cache access is a hit or a miss. In one exemplary embodiment, start traversing the GHB bits starting from the MSB. Stop the traversal at the first bit that is different from the MSB. The number of bits traversed is used as the index of the PHT. The maximum number of bits traversed is equal to the length of the GHB, and hence the maximum number of columns after the second (GHB) column in the table 204, is N.

Here, the GHB has 4 bits, and correspondingly the PHT had 4 columns. Thus, if there are N bits in the GHB, then there are N columns after the second (GHB) column in the table 204. In the example, the rightmost bit 218 is a miss, the next 220 is a miss, and the third 222 is a hit, and then a miss 224. So starting from the rightmost bit 218, the total number of bits traversed before the outcome changed compared to bit 218 is two. So the second column out of the 4 columns of the PHT is accessed.

This procedure is carried out for every LOAD instruction that is seen. Because the tags are saved, which are portions of the load instruction's PC, as soon as it is determined that a particular instruction is a LOAD, use bits of the LOAD PC 208 to hash 206 into the PHT 204, use the high order bits as a tag, and check for a match with the tag stored in the first column of the table 204. If there is a match, read out the prediction based on the GHB's number of contiguous bits with the same value as the MSB, and read the corresponding column output as hit or miss to obtain the prediction as to whether there will be a cache miss or a cache hit associated with the instruction. The prediction is used to benefit execution. If a cache miss is predicted, avoid pushing other, dependent instructions down the pipeline and instead schedule different instructions. If the prediction of a miss is correct, time is saved by scheduling other instructions instead; if the prediction of a miss is incorrect, some time is lost but accuracy is not impacted.

The exemplary embodiment of FIG. 2 represents a relatively hardware-intensive implementation as compared to other exemplary implementations herein, as a number of hardware tables are needed and the PHT has quite a few entries to reduce the likelihood of collisions. Other non-limiting exemplary embodiments herein have less hardware complexity but trade-off other factors. In the example of FIG. 2, prediction accuracy is high because of the use of the tags. There is a theoretical possibility of two LOADs that hash to the same table entry "ping-ponging" back and forth and constantly overwriting entries without ever predicting due to lack of a tag match. Other embodiments predict more aggressively and have lower prediction accuracy by relaxing certain constraints, thus lowering hardware requirements.

Note that hardware tables are preferably implemented as hardware registers (storage elements such as latches) residing in the processor 106 itself.

It should be noted that in some embodiments, instead of using the Hash1 function 206, let the LOAD be any of the entries in the PHT. That is, match the higher order bits of the program counter with every single tag in the PHT (typically hundreds). Whichever one matches is the entry of interest. This is an example of CAM lookup, discussed further below. This provides added flexibility because a load now has, say, 256 different spots to reside in and there is less chance of a collision. A suitable technique is used to "kick out" an entry when the 257$^{th}$ LOAD comes (in a non-limiting example, kick out the oldest entry). However, there is an expense in terms of power in the CAM lookup embodiment, since all (say 256) tag entries in the PHT must be examined. The use of the hash function avoids this by restricting to only a single entry in the table. Thus, as compared to the CAM, the hash technique simplifies the lookup but at the expense of a greater risk of collision because two different loads may hash to the same location. On the other hand, the CAM, as compared to the hash, gives the freedom to go anywhere in the table, but at the cost of a more expensive lookup.

By way of review, one hardware structure includes a GHB (global history buffer) 202 of N bits. In particular, in one or more embodiments, the history register 202 is an N-bit shift register which shifts in bits representing the cache access outcome (hit or miss) of the most recent N accesses. An additional hardware structure includes a PC-based-table 204. Table 204 is an M-entry table, with each entry holding a tag of the PC (in the example of FIG. 2, there are four entries corresponding to tag1, tag2, tag3, and tag4), and a hit or miss predictor of depth N (based on the GHB size of N bits) (in the example of FIG. 2, N=4; thus, the hit-or-miss predictor corresponding to tag1 includes entries M, M, M, and H). Each of the N hit- or miss-predictor entries is only two bits; a miss is predicted if the MSB is 1, and hit is predicted if the MSB is 0. One method step useful in connection with the hardware embodiment of FIG. 2 includes determining the hash index into the PC-based-table by applying a hash function 206 to the PC 208. An example hash function could be some log M bits of the PC. Another example of a hash function could be the result of an XOR operation of 2 separate log M bits of the PC resulting in the result having log M bits. The log M bits of the result of the hash function can access only one of the M entries of the Table 204.

The values of M and N are determined at the design time based on the nature of the applications that will be run on the machine. For example, N could be a few 10 s (like 30 or so), and M could be a few 100 s (like 256 or so).

One or more embodiments do not require a content-addressable memory (CAM) lookup of the table. If a hash function is used as described above, the load PC tag can reside in only one of the M entries of the Table 204 (the entry determined by the value of the log M bits chosen in the hash function). This could potentially lead to collisions as more than one load instruction could map to the same entry of the Table 204. To reduce the chances of collision, it is possible to allow a load PC tag to reside in any of the M locations of the Table 204. As discussed above, this can be achieved using a CAM, where to find a match in the table 204, all the entries are searched with the incoming tag of the load PC, and the matching entry is used for prediction. Similarly, a new entry can be inserted in any of the M positions. If the tag in the hash index does not match the tag of the PC, then stop prediction because the update in the PHT is likely from another LOAD instruction and not the LOAD instruction of interest. In such cases, a default prediction (typically HIT) can be employed.

Another method step useful in connection with the hardware embodiment of FIG. 2 includes determining the hit or miss predictor index for a given entry of the PC-based-table 204. In some instances, start traversing the GHB bits starting from the MSB 218. Stop the traversal at the first bit (here, 222) that is different from the MSB. The number of bits traversed is used as the index of the PHT. Here, two bits 218, 220 are traversed (bits 222 and 224 are numbered for completeness). The maximum number of bits traversed is equal to the length of the GHB, and hence a size of N predictors per entry of the PC-based-table is sufficient. Still another method step useful in connection with the hardware embodiment of FIG. 2 includes updating the PC-based table entry. After the outcome of the current prediction is known, before entering the outcome in the GHB 202, again determine the hash index using the PC, and access the appropriate hit or miss predictor index as described just above. If the current outcome is a miss, increment the chosen hit or miss predictor entry. If the current outcome is a hit, decrement the chosen hit or miss predictor entry.

One or more embodiments relate to predicting whether a cache access (load or store) will result in a cache miss. Based on such a prediction, the processor can take some action, such as re-ordering the instruction schedule so that other instructions go ahead of the instruction that is predicted to result in a cache miss. One or more embodiments make use of the fact that cache misses (and hits) come in bunches. In other words, misses are bursty.

In one or more embodiments, when in a "miss regime" (i.e., a regime where most of the cache accesses were misses), then the next access is predicted to be a miss.

Referring again to FIG. 7, in one aspect, a record of the results of the past x accesses (i.e., either hits or misses) for the application is maintained (in the Global History Table (GHT)) 702 (same as the GHB), and historical information about the results of any accesses that were made after each number of consecutive hits or misses is maintained (in the hit PHT 706 and miss PHT 704). If the last access is a miss, and there have been m consecutive misses, then the corresponding PHT is examined to get information about recent behavior after m consecutive misses. If there were generally misses after m consecutive misses, then the next access is assumed to be a miss. A corresponding action is taken for hits.

Thus, FIG. 7 is illustrative of a simplified alternative embodiment.

In general, all of the illustrative embodiments are preferably carried out early in the processor pipeline (early in the decode stage of the processor), as soon as it is determined that a given instruction is a memory-accessing instruction, without even knowing what memory address is going to be accessed. The PHTs are preferably implemented as hardware tables in the processor, preferably in the decode stage of the processor pipeline. In one or more embodiments, the given instruction is executed normally regardless of the prediction, but the prediction result is used in the scheduling of dependent instructions.

With continued reference to FIG. 7, FIG. 7 can be thought of as the simplest of the exemplary embodiments presented herein. In general, a program, during execution, will have many LOAD instructions seeking to access data from memory. In the example of FIG. 7, rather than being concerned with every separate LOAD instruction in the program, have, for the entire program, a single hardware-implemented global history buffer (GHB) 702 in the processor pipeline. Here, simply monitor cache misses and hits for the entire program, and not for any particular LOAD. Every cache hit or miss is pushed into the GHB, with the most recent outcome being stored in the most significant bit (MSB) 708 and every other result being pushed to the left. For example, a miss can be encoded as a logical zero and a hit can be encoded as a logical one. GHB 702 is preferably implemented as a shift register. In all embodiments, the contents of GHB 202, 402, 702 reflect actual results and not predictions.

Here, looking from the most recent outcome (MSB) 708, determine whether in a "HIT Regime" (a number of hits in a row) or "MISS Regime" (a number of misses in a row). This can be used to predict whether a memory-accessing instruction will result in a cache hit or a cache miss. In the exemplary embodiment of FIG. 7, pick out the most recent outcome, here, a miss, and based on that access the miss pattern history table (Miss-PHT) 704. If the most recent outcome had instead been a hit, then the hit pattern history table (Hit-PHT) 706 would have been accessed. All that remains to be determined is what entry in the Miss-PHT or Hit-PHT should be used to make the prediction. To make such determination, determine the number of contiguous hits or misses, starting from the most recent one (MSB 708). Here, since the most recent actual outcome was a miss, count the number of misses (here, two) until a hit is encountered at 712. Since there are two contiguous misses, access the second entry of the Miss-PHT 704. If there are N bits in the GHB 702, then the maximum number of contiguous hits or misses is N. Accordingly, the Miss-PHT and Hit-PHT each require N entries. The value of the entry is the prediction.

At this point, the LOAD instruction is still in the early part of the pipeline (i.e., the decoder). The cache has not yet been accessed. Later, the cache will actually be accessed and the actual outcome will be pushed into GHB 702 as the MSB 708. Furthermore, the Miss-PHT, which was used to make the prediction, will also be updated based on whether the prediction was right or wrong (and similarly for the Hit-PHT if the Hit-PHT had been used to make the prediction).

One or more embodiments thus carry out the indicated techniques before accessing the cache, determine that an instruction will require a memory access, and then predict whether it will be a cache miss or a cache hit.

Figure 4:
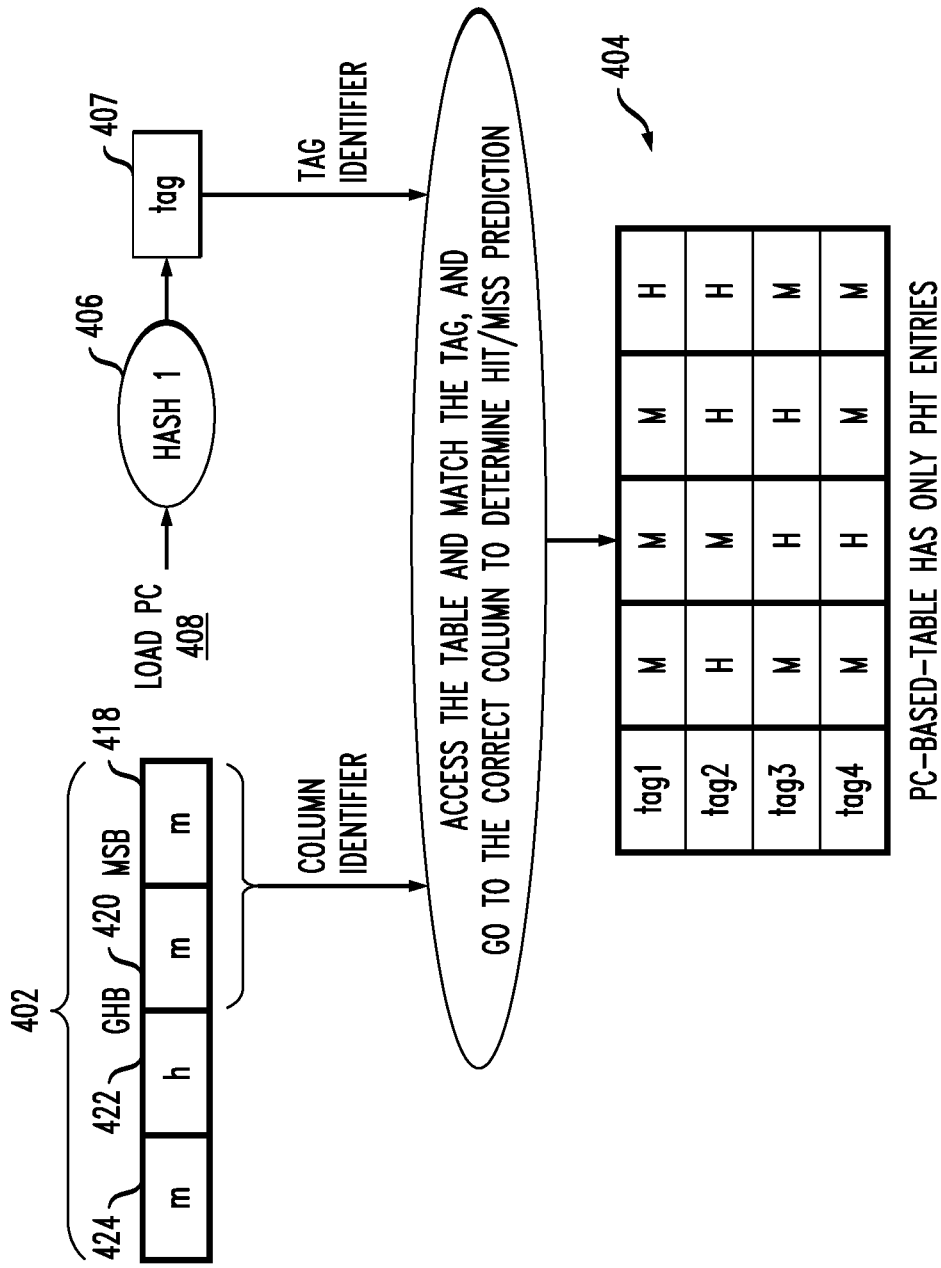
FIG. 4 depicts a second exemplary embodiment for per-load hit/miss prediction using global hit/miss behavior, according to an aspect of the invention.

Reference should now be had to FIG. 4. Items similar to those in FIG. 2 have received the same reference character incremented by two hundred. Recall that in FIG. 2, each entry in the PHT 204 maintained its own GHB 202, i.e. GHB1, GHB2, and so on. The individual GHBs in FIG. 2 maintained the hit-miss outcomes for the particular tag, i.e. tag1, tag2, and so on. Every load instruction in the embodiment of FIG. 2 thus had its own GHB. This is expensive. In the embodiment of FIG. 4, the GHB 402 is truly global and not specific to a particular LOAD or STORE. Here, the single GHB 402 monitors for the entire program, and not just for a specific LOAD, the most recent N outcomes of cache access. In the embodiment of FIG. 4, use the global GHB 402 and not the per-entry GHB of FIG. 2 to determine which column of the PHT 404 should be accessed.

The operation of the embodiment of FIG. 4 is otherwise similar to that of FIG. 2; namely, take the LOAD PC, use some bits thereof in a hash 406 (e.g., take the most significant 30 bits) to determine a tag identifier 407, and match the tag in the first column of the PHT 404 (analogous to the CAM lookup of FIG. 2). The entry with the matching tag is the entry of interest. Within that entry, it remains to determine what column to access, using the global GHB 402. Here, use the same technique of determining the number of contiguous hits or misses and use that to determine what column to access in the row for the tag of interest. The embodiment of FIG. 4 gives up some accuracy as compared to FIG. 2, but saves hardware.

To reiterate, the tables for each illustrated embodiment are preferably maintained as hardware tables in the decode stage of the processor pipeline, and the illustrated steps are carried out early-on, upon determination that a given instruction is a memory-accessing instruction such as a LOAD.

Figure 12:
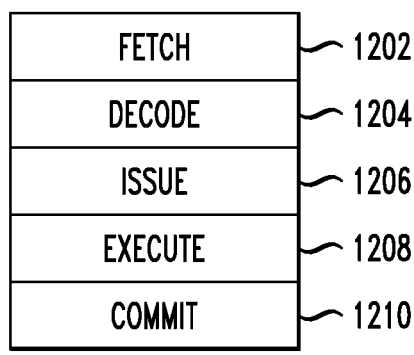
FIG. 12 depicts an exemplary processor pipeline.

FIG. 12 presents a non-limiting example of five stages in a generic processor pipeline, such as might be employed by a core 106 or other processor. Instructions are fetched in FETCH stage 1202. Instructions are decoded in DECODE stage 1204. In one or more embodiments, the prediction techniques set forth herein are executed at this stage, as soon as it is determined that a particular instruction is one requiring memory access (e.g., LOAD or STORE). The issue stage 1206 comes next and the prediction can be used at this stage for scheduling. The next stage is the execute stage 1208; following execution, the actual results can be updated as discussed elsewhere herein. The final stage is the commit stage 1210. Other types of staging can be employed in other embodiments; however, a significant aspect of one or more embodiments is the prediction at the decode or equivalent stage and taking the prediction into account before execution or the like.

One or more embodiments work separately at each individual cache level (L1, L2, and so on). However, in some cases, the techniques described can be implemented for multiple levels at the same time. For example, the GHB tracks all the true outcomes. The illustrative examples have focused, by way of example and not limitation, on the L1 level of cache. Every time there is an L1 actual hit or miss, the GHB is updated by pushing the result into the MSB. A similar GHB can be maintained for the L2 level of cache. This L2 GHB is updated whenever there is an L2 actual hit or miss. A separate GHB and PHT can be maintained for every cache level. The operation is otherwise similar.

One or more embodiments thus provide techniques wherein the GHR (similar to GHB) and/or branch target buffer (BTB) can be used to predict cache misses. In one or more embodiments, a prediction table is on the order of 2*N bits ("*" stands for multiplication not exponential). In one or more embodiments, replacements from the cache are handled by an existing replacement policy, and techniques are provided to predict whether a cache access will result in a hit or a miss. One or more instances are applicable to data and/or instruction caches.

Figure 3:
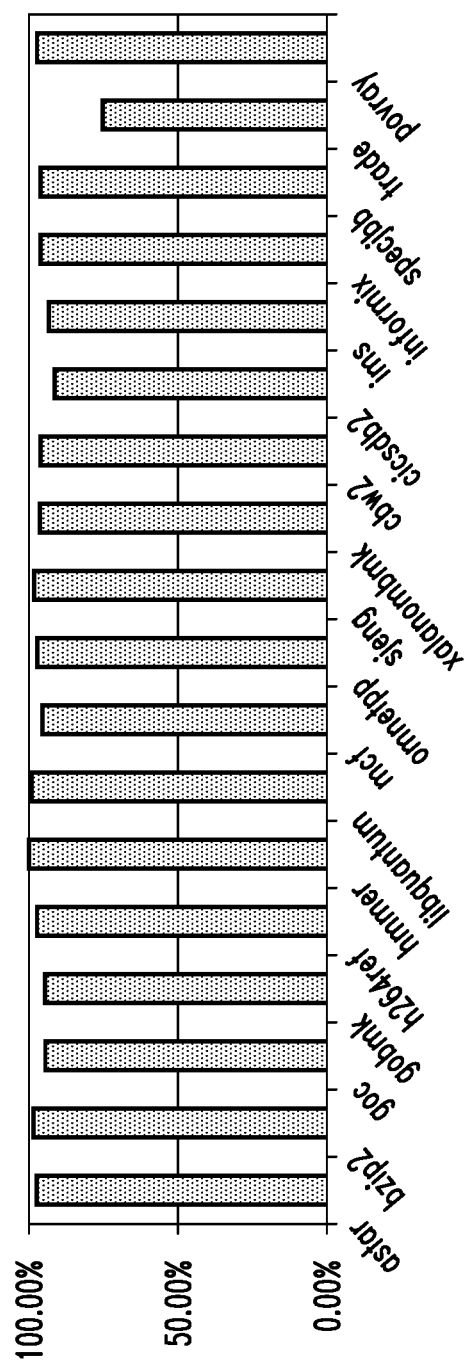
FIG. 3 shows exemplary prediction accuracy for L1 Dcache, according to an aspect of the invention.

FIG. 3 presents non-limiting exemplary data for a 64 KB, 8 way associative Dcache and 1.5 MB, 12 way associative L2 Dcache. The input was a plurality of z-series PCATZ D-cache reference traces. The horizontal axis represents a number of different well-known so-called SPEC applications and IBM applications while the vertical axis shows the percent accuracy in predicting the L1 cache hit or miss.

Figure 5:
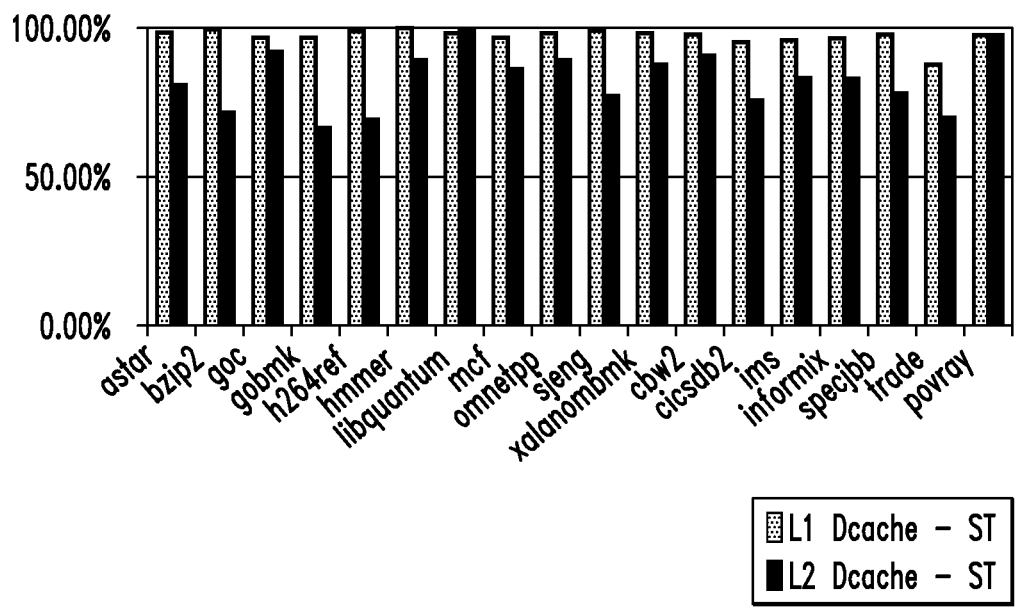
FIGS. 5 & 6 show exemplary prediction accuracy for L1 and L2 Dcache, according to an aspect of the invention.
Figure 6:
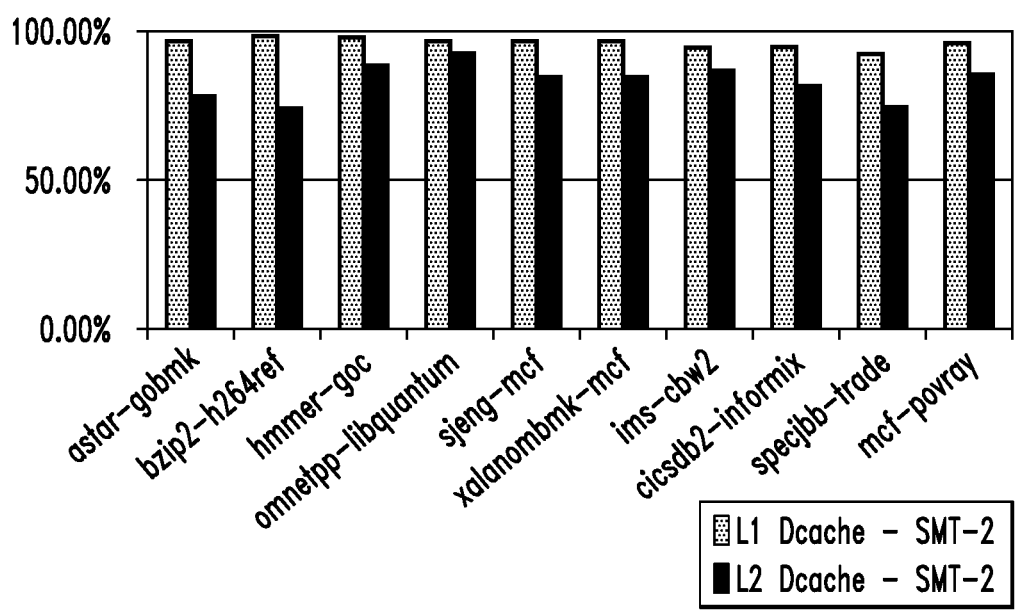

FIGS. 5 and 6 present non-limiting exemplary data for prediction accuracy for L1 and L2 Dcache. The axes are analogous to those in FIG. 3. As can be seen therein, high accuracy can be achieved with less hardware. Furthermore, effectiveness is shown as to both L1 and L2 cache "miss" prediction. The benefit of holding-off dependent instructions if data will not be present in the L2 cache as well can also be seen. Furthermore, as can be seen, there is effectiveness for both single-thread (FIG. 5) and simultaneous multi-threading (SMT) (FIG. 6), and a benefit is attained by scheduling a different thread when a cache miss is predicted for one thread. A small percentage of load and/or store instructions are responsible for a large percentage of cache misses.

FIGS. 8-11 present additional non-limiting exemplary data for prediction accuracy for L1 and L2 Dcache. As can be seen therein, application global behavior is sufficient to predict misses, and one or more exemplary techniques are effective in both L1 and L2 cache "miss" prediction, and for single and multi-threaded applications. The axes are analogous to those in FIG. 3.

FIG. 3, FIGS. 5 and 6, and FIGS. 8-11 thus present non-limiting exemplary results for the corresponding embodiments of FIGS. 2, 4, and 7.

Thus, in one or more instances, it is sufficient to predict the next cache access outcome based on the length of the last seen contiguous string of "hits" or "misses." One or more embodiments use only N entries to predict outcome instead of $2^N$ entries. In tracking per-load hit or miss behavior, it is noted that in many instances, only a small percentage of loads are responsible for a large fraction of cache misses. Furthermore, in tracking a global "hit" and/or "miss" region of applications, application behavior is typically a good guide to hit and/or miss prediction, and non-destructive interference among loads is observed. Thus, FIG. 2 has the most complex hardware, FIG. 7 the least, and FIG. 4 has intermediate hardware complexity.

Given the discussion thus far, it will be appreciated that, in general terms, an exemplary method, according to an aspect of the invention, includes the step of decoding, in a decode stage 1204 of hardware processor pipeline, one particular instruction of a plurality of instructions (e.g., the instruction whose LOAD PC is 208 or 408). An additional step includes determining that the particular instruction requires a memory access (e.g., is a LOAD or STORE); and, responsive to determining that the particular instruction requires a memory access, predicting whether the memory access will result in a cache miss; for example, using the techniques of FIG. 2, 4, or 7. The predicting in turn includes accessing one of a plurality of entries in a pattern history table (e.g., 204, 404, or 704 plus 706) stored as a hardware table in the decode stage 1204. The accessing is based, at least in part, upon at least a most recent entry in a global history buffer such as 202, 402, or 702. The pattern history table stores a plurality of predictions (e.g., the individual "M" or "H" values). The global history buffer stores actual results of previous memory accesses as one of cache hits and cache misses. Additional steps include scheduling at least one additional one of the plurality of instructions in accordance with the predicting (as described elsewhere herein); and updating the pattern history table and the global history buffer subsequent to actual execution of the particular instruction in an execution stage 1208 of the hardware processor pipeline, to reflect whether the predicting was accurate.

In some cases, such as depicted in FIG. 7, the global history buffer 702 stores combined results for all given ones of the plurality of instructions requiring memory access, and the pattern history table includes a miss pattern history table 704 and a hit pattern history table 706. Furthermore, in such cases, the predicting includes accessing the most recent entry 708 in the global history buffer to determine whether the most recent entry in the global history buffer is a hit or a miss (in the example of FIG. 7, a miss); accessing the miss pattern history table 704 if the most recent entry in the global history buffer is a miss; and accessing the hit pattern history table 706 if the most recent entry in the global history buffer is a hit. In each case, accessing the respective table 704, 706 includes accessing an entry therein corresponding to a number of contiguous misses or hits in the global history buffer, as the case may be, including the most recent entry in the global history buffer.

Reference should now be had to FIG. 4. To avoid confusion, recall that FIG. 4 can include a CAM aspect where a hash is carried out only to extract a tag, as well as a hash aspect, where there is a hash to obtain an index to a table entry, as well as a check whether the extracted tag matches the tag for that row. Thus, in some instances, such as the "hash" approach of FIG. 4, the global history buffer 402 stores combined results for all given ones of the plurality of instructions requiring memory access; the pattern history table 404 has M entries (in the example, 16) arranged in rows (here, 4) and N columns (here, N=4), and each of the rows also has a stored tag value (tag1, tag2, tag3, or tag4 in the example) associated therewith. The particular instruction has a program counter 408 associated therewith. The predicting includes hashing the program counter to obtain a hash 406 having log M bits; extracting a tag 407 from the program counter; accessing the one of the plurality of entries in the pattern history table based on the hash; and, as described above, determining whether that one of the stored tag values corresponding to a given one of the rows in which the one of the plurality of entries in the pattern history table resides matches the extracted tag. If the one of the stored tag values corresponding to the given one of the rows in which the one of the plurality of entries in the pattern history table resides does not match the extracted tag, it is assumed that a collision has occurred, and a default prediction (typically, assuming a cache hit) is made. If the one of the stored tag values corresponding to the given one of the rows in which the one of the plurality of entries in the pattern history table resides does indeed match the extracted tag, a further step includes accessing an entry in the given one of the rows based on the number of contiguous bits traversed starting with the MSB of the global history buffer, until the first bit that is different from the MSB On the other hand, in the CAM approach of FIG. 4, the global history buffer 402 stores combined results for all given ones of the plurality of instructions requiring the memory access; the pattern history table has M entries (here, 16) arranged in rows (here, 4) and N columns (here, N=4), and each of the rows has a stored tag value (tag1, tag2, tag3, tag4, in the example) associated therewith. The particular instruction has a program counter 408 associated therewith. The predicting includes extracting a tag 407 from the program counter; accessing a corresponding one of the rows for the one of the plurality of entries in the pattern history table 404 based on the extracted tag (i.e., look for a match with tag1, tag2, tag3, or tag4 in CAM fashion); and accessing an entry in the corresponding one of the rows based on the number of contiguous bits traversed starting with the MSB of the GHB, until the first bit that is different from the MSB. If for some reason there is no matching tag, a default prediction can optionally be made as above.

In some cases, such as the "hash" approach of FIG. 2, the pattern history table 204 has M entries (here, 16) arranged in rows (here, 4) and N columns (here, N=4), each of the rows has a stored tag value (in the example, tag1, tag2, tag3, or tag4) associated therewith, and each of the rows has an instruction-specific portion of the global history buffer 202 associated therewith (designated as GHB1, GHB2, GHB3, or GHB4, in the example). Furthermore, the particular instruction has a program counter 208 associated therewith. In addition, the predicting includes hashing the program counter to obtain a hash 206 having log M bits; extracting a tag from the program counter; and accessing the one of the plurality of entries in the pattern history table based on the hash. An additional step includes determining whether that one of the stored tag values corresponding to a given one of the rows in which the one of the plurality of entries in the pattern history table resides matches the extracted tag. If this is not so, assume a collision has occurred and make a default prediction, typically, "hit." On the other hand, if there is indeed a match, access an entry in the given one of the rows access the column based on the number of contiguous bits traversed starting with the MSB of the GHB, until the first bit that is different from the MSB.

On the other hand, in the CAM approach of FIG. 2, the pattern history table 204 has M entries (here, 16) arranged in rows (here, 4) and N columns (here, N=4), each of the rows has a stored tag value (in the example, tag1, tag2, tag3, or tag4) associated therewith, and each of the rows has an instruction-specific portion of the global history buffer 202 associated therewith (i.e., GHB1, GHB2, GHB3, or GHB4 in the example). The particular instruction has a program counter 208 associated therewith. The predicting includes extracting a tag from the program counter; accessing a corresponding one of the rows for the one of the plurality of entries in the pattern history table based on the extracted tag (i.e., look for a match with tag1, tag2, tag3, or tag4 in CAM fashion); and accessing an entry in the corresponding one of the rows based on the number of contiguous bits traversed starting with the MSB of the corresponding instruction-specific portions of the N bit global history buffer, until the first bit that is different from the MSB. If for some reason there is no matching tag, a default prediction can optionally be made as above.

Furthermore, given the discussion thus far, it will be appreciated that, in general terms, an exemplary hardware processor, according to an aspect of the invention, includes a decode pipeline stage 1204 which decodes one particular instruction of a plurality of instructions; hard-wired logic circuitry which determines that the particular instruction requires a memory access; a pattern history hardware table (e.g., 204, 404, or 704 and 706) within the decode pipeline stage; and a global history buffer 202, 402, or 702 within the decode pipeline stage. Also included is hard-wired logic circuitry which, responsive to determining that the particular instruction requires a memory access, predicts whether the memory access will result in a cache miss. The predicting in turn includes accessing one of a plurality of entries in the pattern history hardware table. The accessing is based, at least in part, upon at least a most recent entry in the global history buffer. The pattern history hardware table stores a plurality of predictions. The global history buffer stores actual results of previous memory accesses as one of cache hits and cache misses. Also included are an issue pipeline stage 1206 which schedules at least one additional one of the plurality of instructions in accordance with the predicting; an execution pipeline stage 1208 which actually executes the particular instruction; and hard-wired logic circuitry which updates the pattern history hardware table and the global history buffer subsequent to the actual execution of the particular instruction, to reflect whether the predicting was accurate.

The global history buffer and pattern history table can be configured as described with respect to any of the methods herein, and hard-wired logic circuitry can be provided to implement and of the method steps described herein.

In still another aspect, an exemplary hardware processor includes means for carrying out the method steps. The means include various structures disclosed herein, such as hardware tables, buffers such as shift registers, and hard-wired logic circuitry to implement the method steps.

Integrated circuit chips embodying aspects of the invention can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, typically an advanced computer product having one or more central processors and optionally a display, a keyboard or other input device, and the like.

Figure 13:
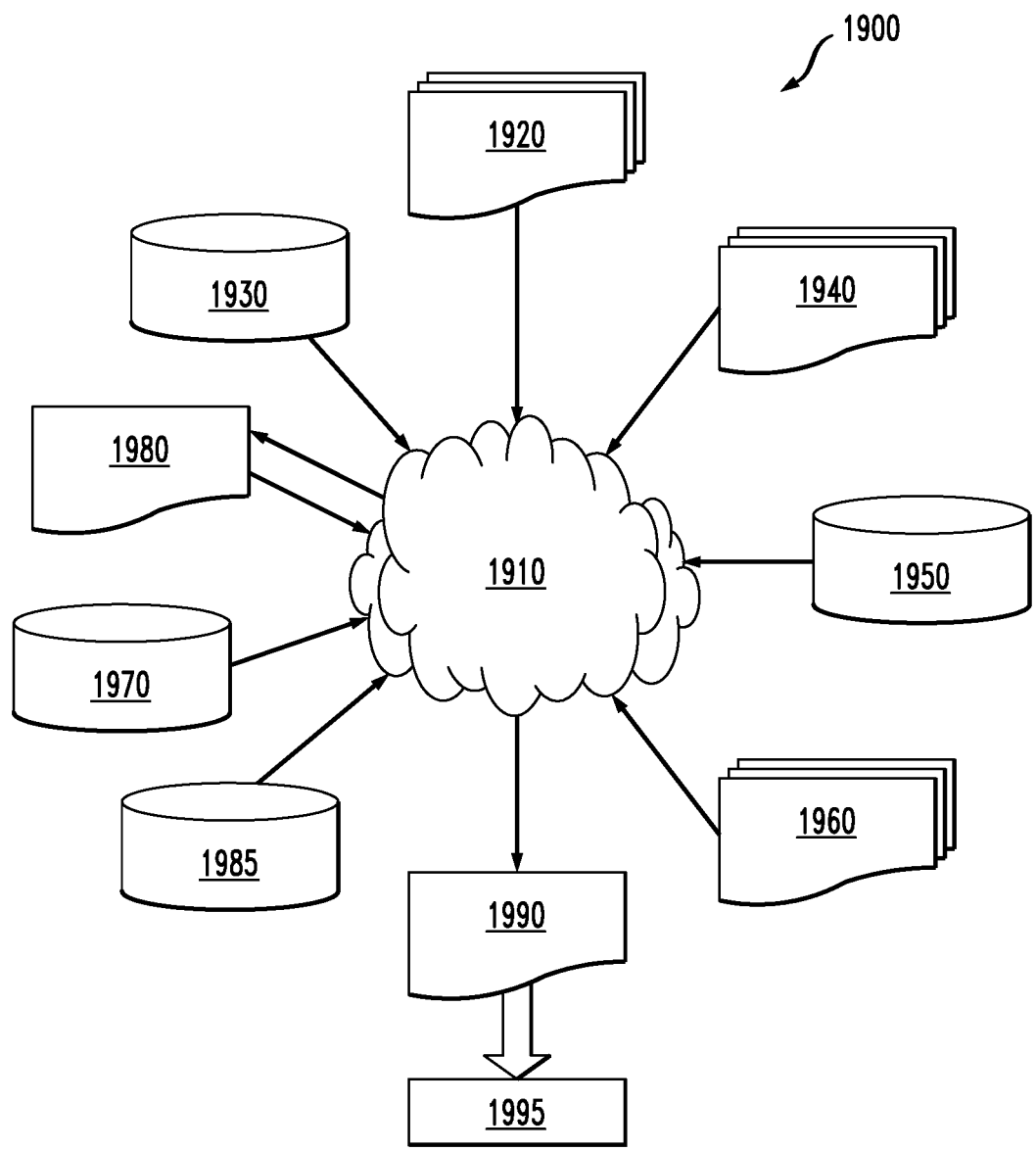
FIG. 13 is a flow diagram of a design process used in semiconductor design, manufacture, and/or test.

FIG. 13 shows a block diagram of an exemplary design flow 1900 used for example, in semiconductor IC logic design, simulation, test, layout, and manufacture. Design flow 1900 includes processes, machines and/or mechanisms for processing design structures or devices to generate logically or otherwise functionally equivalent representations of the design structures and/or devices described above and shown in FIGS. 1, 2, 4, 7, and 12. The design structures processed and/or generated by design flow 1900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1900 may vary depending on the type of representation being designed. For example, a design flow 1900 for building an application specific IC (ASIC) may differ from a design flow 1900 for designing a standard component or from a design flow 1900 for instantiating the design into a programmable array, for example a programmable gate array (PGA) or a field programmable gate array (FPGA) offered by Altera® Inc. or Xilinx® Inc.

FIG. 13 illustrates multiple such design structures including an input design structure 1920 that is preferably processed by a design process 1910. Design structure 1920 may be a logical simulation design structure generated and processed by design process 1910 to produce a logically equivalent functional representation of a hardware device. Design structure 1920 may also or alternatively comprise data and/or program instructions that when processed by design process 1910, generate a functional representation of the physical structure of a hardware device. Whether representing functional and/or structural design features, design structure 1920 may be generated using electronic computer-aided design (ECAD) such as implemented by a core developer/designer. When encoded on a machine-readable data transmission, gate array, or storage medium, design structure 1920 may be accessed and processed by one or more hardware and/or software modules within design process 1910 to simulate or otherwise functionally represent an electronic component, circuit, electronic or logic module, apparatus, device, or system such as those shown in FIGS. 1, 2, 4, 7, and 12. As such, design structure 1920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1910 preferably employs and incorporates hardware and/or software modules for synthesizing, translating, or otherwise processing a design/simulation functional equivalent of the components, circuits, devices, or logic structures shown in FIGS. 1, 2, 4, 7, and 12 to generate a Netlist 1980 which may contain design structures such as design structure 1920. Netlist 1980 may comprise, for example, compiled or otherwise processed data structures representing a list of wires, discrete components, logic gates, control circuits, I/O devices, models, etc. that describes the connections to other elements and circuits in an integrated circuit design. Netlist 1980 may be synthesized using an iterative process in which netlist 1980 is resynthesized one or more times depending on design specifications and parameters for the device. As with other design structure types described herein, netlist 1980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1910 may include hardware and software modules for processing a variety of input data structure types including Netlist 1980. Such data structure types may reside, for example, within library elements 1930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1940, characterization data 1950, verification data 1960, design rules 1970, and test data files 1985 which may include input test patterns, output test results, and other testing information. Design process 1910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1910 without deviating from the scope and spirit of the invention. Design process 1910 may also include modules for performing standard circuit design processes such as timing analysis, verification, design rule checking, place and route operations, etc.

Design process 1910 employs and incorporates logic and physical design tools such as HDL compilers and simulation model build tools to process design structure 1920 together with some or all of the depicted supporting data structures along with any additional mechanical design or data (if applicable), to generate a second design structure 1990. Design structure 1990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1920, design structure 1990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1, 2, 4, 7, and 12. In one embodiment, design structure 1990 may comprise a compiled, executable HDL simulation model that functionally simulates the devices shown in FIGS. 1, 2, 4, 7, and 12.

Design structure 1990 may also employ a data format used for the exchange of layout data of integrated circuits and/or symbolic data format (e.g. information stored in a GDSII (GDS2), GL1, OASIS, map files, or any other suitable format for storing such design data structures). Design structure 1990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1, 2, 4, 7, and 12. Design structure 1990 may then proceed to a stage 1995 where, for example, design structure 1990: proceeds to tape-out, is released to manufacturing, is released to a mask house, is sent to another design house, is sent back to the customer, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   fetching an instruction using a program counter; and
   predicting whether a memory access required by said instruction will result in a cache miss based on said program counter, wherein predicting whether said memory access will result in a cache miss further comprises accessing one of a plurality of entries in a pattern history table stored as a hardware table in said decode stage according to at least a most recent entry in a global history buffer, said pattern history table storing a plurality of predictions, said global history buffer storing actual results of previous memory accesses as one of cache hits and cache misses.

2. The method of claim 1, further comprising:
   scheduling an additional instruction in accordance with said predicting; and
   updating said pattern history table and said global history buffer subsequent to actual execution of said instruction in an execution stage of a hardware processor pipeline, to reflect whether said predicting was accurate.

3. A computer product comprising a non-transitory computer readable storage medium having computer-executable code embodied therewith, said computer-executable code executable by a hardware processor to cause said hardware processor to perform a method comprising:
   fetching an instruction using a program counter; and
   predicting whether a memory access required by said instruction will result in a cache miss based on said program counter, wherein predicting whether said memory access will result in a cache miss further comprises accessing one of a plurality of entries in a pattern history table stored as a hardware table in said decode stage according to at least a most recent entry in a global history buffer, said pattern history table storing a plurality of predictions, said global history buffer storing actual results of previous memory accesses as one of cache hits and cache misses.

4. The computer product comprising said non-transitory computer readable storage medium of claim 3, further comprising computer-executable code executable by the hardware processor to cause said hardware processor to perform a method:
   scheduling an additional instruction in accordance with said predicting; and
   updating said pattern history table and said global history buffer subsequent to actual execution of said instruction in an execution stage of a pipeline of said hardware processor, to reflect whether said predicting was accurate.

* * * * *